(12) United States Patent
Kramarenko et al.

(10) Patent No.: US 11,058,116 B1
(45) Date of Patent: Jul. 13, 2021

(54) COMPOSITION FOR STIMULATING PLANT GROWTH AND RESISTANCE TO STRESS FACTORS

(71) Applicant: AGRATEK PTE. LTD., Singapore (SG)

(72) Inventors: Aleksei Valentinovich Kramarenko, Moscow (RU); Sergey Konstantinovich Sayfudinov, Moscow (RU); Dmitry Mikhaylovich Mikhaylov, Moscow (RU)

(73) Assignee: AGRATEK PTE. LTD., Singapore (SG)

( * ) Notice: Subject to any disclaimer, the term of this patent is extended or adjusted under 35 U.S.C. 154(b) by 121 days.

(21) Appl. No.: 16/267,910

(22) Filed: Feb. 5, 2019

Related U.S. Application Data

(60) Provisional application No. 62/626,910, filed on Feb. 6, 2018.

(51) Int. Cl.
| | | |
|---|---|---|
| *A01N 55/00* | (2006.01) | |
| *A01N 59/00* | (2006.01) | |
| *A01N 61/02* | (2006.01) | |
| *A01N 37/42* | (2006.01) | |
| *A01N 37/46* | (2006.01) | |
| *A01N 37/40* | (2006.01) | |
| *A01N 37/02* | (2006.01) | |

(52) U.S. Cl.
CPC ............ *A01N 55/00* (2013.01); *A01N 37/02* (2013.01); *A01N 37/40* (2013.01); *A01N 37/42* (2013.01); *A01N 37/46* (2013.01); *A01N 59/00* (2013.01); *A01N 61/02* (2013.01)

(58) Field of Classification Search
CPC ........ A01N 55/00; A01N 37/02; A01N 37/40; A01N 37/42; A01N 37/46; A01N 59/00; A01N 61/02
USPC ........................................................ 504/124
See application file for complete search history.

*Primary Examiner* — Johann R Richter
*Assistant Examiner* — Courtney A Brown
(74) *Attorney, Agent, or Firm* — Bardmesser Law Group

(57) ABSTRACT

The invention relates to agriculture, to stimulation of germination in agricultural plants and seeds in the initial growth phase. The composition activates plant growth and induces resistance to biotic and abiotic stresses, to reduce incidence of micromycetes damaging the root system. The composition includes a liquid solution containing a water-soluble silicon-organic compounds containing potassium silicate or sodium silicate; the liquid solution including a solvent to dissolve the water-soluble silicon-organic compounds; salicylate in an amount of 0.1% to 2% by volume; the liquid solution also containing succinate and citrate as an acidity regulator; at least one chelate; and at least one trace element and/or at least one carboxylic acid and/or at least one amino acid. The pH of the composition is from 6.5 to 10.9.

28 Claims, No Drawings

COMPOSITION FOR STIMULATING PLANT GROWTH AND RESISTANCE TO STRESS FACTORS

CROSS REFERENCE TO RELATED APPLICATIONS

This application claims priority to U.S. Provisional Application No. 62/626,910, filed on Feb. 6, 2018.

BACKGROUND OF THE INVENTION

Field of the Invention

The solution uses a balanced, microelement composition for the tasks of polyfunctional compounds, the properties of the chelators, but derived from the use of, and in conjunction with non-toxic and completely safe for the environment substances.

Thus, of great interest are new findings in the area of new multifunctional drugs showing a synergistic effect when used together.

The present invention is the creation of concentrated polyfunctional compound recommended for dissolved water in organic farming, in hydroponic substrates, saline and degraded soils, closed ground (greenhouses), aquaponics, while growing different plants and are able to give maximum effect with quite small doses of the introduction.

The technical result, after use of the composition, is achieved: by increasing stress resistance of plants to biotic and abiotic stresses, reduction in the incidence of micromycetes (*Fusarium, Alternaria* blight, late blight), acceleration of seed germination and plants in the initial phase of development, accelerated rooting and acclimatization under clonal reproduction, acceleration of growth of the root system.

SUMMARY OF THE INVENTION

In one aspect, a composition for stimulating seed germination, plant growth and resistance to stress factors caused by biotic and abiotic stress. The composition includes a liquid solution containing a water-soluble silicon-organic compounds containing potassium silicate or sodium silicate; the liquid solution including a solvent to dissolve the water-soluble silicon-organic compounds; salicylate in an amount of 0.1% to 2% by volume of the total composition; the liquid solution also containing succinate and citrate as an acidity regulator; at least one chelate; and at least one trace element and/or at least one carboxylic acid and/or at least one amino acid. The pH of the composition is from 6.5 to 10.9.

Additional features and advantages of the invention will be set forth in the description that follows, and in part will be apparent from the description, or may be learned by practice of the invention. The advantages of the invention will be realized and attained by the structure particularly pointed out in the written description and claims hereof.

It is to be understood that both the foregoing general description and the following detailed description are exemplary and explanatory and are intended to provide further explanation of the invention as claimed.

DETAILED DESCRIPTION OF THE PREFERRED EMBODIMENTS

Reference will now be made in detail to the preferred embodiments of the present invention.

The advantage of the invention is the ability of the composition to increase the stress tolerance of plants during the vegetation period. One advantage of this invention is relatively easy availability of all available substances in the composition. One aspect of the novelty of the invention is the composition resulting in combinant solutions to selected substances and new synergistic properties.

The invention provides a composition for stimulating seed germination, plant growth and resistance to stress factors caused by biotic and abiotic stress. The composition includes a liquid solution containing a water-soluble silicon-organic compounds containing potassium silicate or sodium silicate; the liquid solution including a solvent to dissolve the water-soluble silicon-organic compounds; salicylate in an amount of 0.1% to 2% by volume of the total composition; the liquid solution also containing succinate and citrate as an acidity regulator; at least one chelate; and at least one trace element and/or at least one carboxylic acid and/or at least one amino acid. The pH of the composition is from 6.5 to 10.9.

The essence of the invention lies in the structure of structural composition, which is silicone frame having a branched structure and is related to siloxides and which is a silicon compound of the formula $R_3SiOM$, where R is an organic group and M is a cation of the metal/metals. As metal-organic groups, according to the invention, in the frame of siloxide used derivatives of succinates, citrates, salicylates, organic acids, amino acids and alcohols.

Each substance in the structure of the frame has its purpose, is not an antagonist to each other, and mutually complements and enhances the property of each.

It is known that the action of siloxides, like ligands, which have the reactivity to form chelate complexes, allows to use silicide as inducers of elicitors or stimulators of cell growth of plants, which is consistent with the purpose of this invention. The chelate complexes can be based on any of potassium, sodium, magnesium, calcium, zinc, copper, iron, and sulfur, in an amount of from 0.05% to 25% of the total composition.

An illustration of the mechanism of action of the composition according to the present invention is the following: a solution with siloxide-based falling on the surface of the soil, leaf or root system and as a result of chemical absorption and the resulting covalent bonds, with varying degrees of reaction speed, depending on the environment, releases the inductors, allowing the plant to use them.

The source of silica can be selected, for example, from a gel of silicic acid, silica gel $SiO_2*nH_2O$ or from silicates of potassium or sodium, e.g., from 0.1% to 32% of the total weight of the composition. A ratio of potassium silicate to sodium silicate is from about 1 to 5 to 1 to 10, which is obtained by mixing at a temperature of from 20 to 85 degrees Celsius. Alternatively, the ratio of potassium silicate to sodium silicate can be 4 parts potassium silicate to 1 part sodium silicate. The ratio of sodium silicate and potassium silicate can be 10 parts of sodium silicate and 1 part of potassium silicate. The water-soluble silicon-organic compounds can use large-pore or porous or granular or solid particles of silica in an amount of 0.1% to 32% by volume of the total composition. The silicon-organic compound can include silica particles of 0.1 µm to 100 µm in size, and/or 50 µm to 500 µm in size, preferably 50 µm to 100 µm in size. The silica particles can be present in an amount of 0.1% to 5% by volume of the total composition.

The role of silicon in plant growth is not fully understood, but available data allows to suggest that silicon has a great importance in the proper formation of plant structures, especially in the initial phase, and particularly the protective properties under stress.

A solvent is needed to dissolve the water-soluble silicon-organic compounds in water. As an example of such a solvent, propylene glycol is used as the solvent, from about 0.1% to about 12% of a total volume of the water-soluble silicon-organic compounds, preferably from 2.0% to 6.0% of the total volume. Alternatively, polyvinyl alcohol is used as the solvent, in amounts from about 0.1% to about 12% of a total volume of the water-soluble silicon-organic compounds, preferably 2% to about 6% of the total volume of the water-soluble silicon-organic compounds. Alternatively, ethyl alcohol can be used as a solvent, from about 2% to about 6% of a total volume of the water-soluble silicon-organic compounds.

Potassium succinate and sodium succinate was chosen for the composition because of its ability to stimulate linear growth (pulling) of plant structures and micropolygons; stimulate the regeneration of leaves at the micropolygons and their reproduction (multiplication); improve the overall condition of the micropolygons, reduction of vitrification and chlorosis of tissues of themicropolygons; in some cultures, such as the family Rosaceae, potassium succinate, sodium succinate act as retardants of the growth processes (see Buntsevich L. L., *Impact of growth, regulators which were not used earlier in clonal micropropagation on microshoots of plum in vitro*, The Scientific Journal of the Kuban State Agrarian University, No. 115(01), 2016, UDC 573.6: 634.11:631.53).

Also, studies have shown that pre-treatment of seeds with a solution of succinate of magnesium leads to increased germination to 99%, reduces the seeds infection with mold 86% (see Medvedeva N. V., Nikishina M. B., Melnik L. S., et al., *Effect of Organic Acid Salts on the Initial Growth Processes of Malting Barley*, DOI 10.12851/EESJ201404ART08).

As examples, the succinate used in the invention can be potassium succinate ($K_2C_4H_4O_4$) in an amount of 0.15% to 2.9% by volume of the total composition, or sodium succinate ($Na_2C_4H_4O_4$) in an amount of 0.1% to 5% by volume of the total composition, preferably from 0.15% to 2.9% by volume of the total composition. The succinate can be calcium succinate ($CaC_4H_4O_4$) in an amount of 0.1% to 5% by volume of the total composition, preferably from 0.15% to 2.9% of the total composition, or the succinate can be magnesium succinate ($Mg_2C_4H_4O_4$) in an amount of 0.1% to 5% of the total composition, preferably from 0.15% to 2.9% of the total composition.

As is known from numerous studies, salicylates belong to the phytohormone of phenolic nature which have a regulatory effect on many physiological processes in plants, including thermogenesis, induction of resistance to the attack of pathogens, adverse environmental conditions, germination of seeds, flowering of plants, and ethylene synthesis during the ripening of fruits.

Thus, in one embodiment, the salicylate is sodium salicylate in an amount of 0.1% to 2% of the total composition, preferably 0.1% to 0.5%. Alternatively, the salicylate is potassium salicylate in an amount of from 0.1% to 2% by volume of the total weight of the composition, and preferably from 0.1% to 0.5%. The salicylate can includes sodium salicylate and potassium salicylate, in a proportion of 1 part potassium salicylate to 1-5 parts of sodium salicylate. Alternatively, the salicylate can be sodium salicylate and potassium salicylate in an amount of from 0.1% to 0.5% for both by volume of the total composition, preferably 0.1% to 2.5% by volume of the total composition. The salicylate can also include salicylic acid in an amount of 0.1% to 0.5% by volume of the total composition. The salicylate can also include magnesium salicylate in an amount of 0.1% to 2.5% by volume of the total composition, preferably 0.15% to 0.5% by volume of the total composition. The ratios of sodium salicylate, potassium salicylate, magnesium salicylate can be from 1 to 10 parts salicylate of potassium, from 1 to 5 parts of sodium salicylate, 1 to 5 parts of magnesium salicylate, and a total of 0.1% to 2% for all the salicylates in the total composition, preferably from 0.15% to 0.5%.

The mechanism of action of salicylic acid and its salts, expressed as part of the processes of amplification and multiplication of signals from the receptors in the cells of a plant, ensures timely activation of the protection. The earliest reaction of plant organism to the introduction of the pathogen, local generation of reactive oxygen species (oxidative burst), which triggers a chain of subsequent defense reactions (see Tyuterev S. L., *The scientific basis of induced baleneological plants: monograph*, Russian Academy of Agricultural Sciences, All Russian Scientific Research Institute of Plant Protection, Saint Petersburg: [b. I.], 2002, p. 298-324). A significant increase in the content of active forms of $O_2$ and $H_2O_2$ has an inhibitory effect on the development of pathogenic microorganisms. It is assumed that the activated forms of oxygen also play a significant role in lipoxidase membranes, modification of the cell wall and signal transduction (Richael, C., Gilchrist, D., *The hypersensitive response: A case of hold or fold*, Physiol. and Mol. Plant Pathol. 1999, 55(1): 5-12 (doi: 10.1006/pmpp.1999.0209); Pietras T., Malolepsza U., Witusik A., *Udzialnadtlenkuwodoruireaktywnychpostacitlenuwytwarzanychprzezoksydaze NADPH w odpornosciroslinprzeciwko patogenom*, Wiad. Bot. 1997, 41(3-4): 43-50).

The substances used in the present invention carry such important elements as potassium, magnesium and sodium. Potassium has an important role has in carbohydrate and protein metabolism of plants. Various scientific studies have proven that potassium affects the physical condition of the colloids of the cell, increases water-holding capacity of the protoplasm, the resistance of plants to wilting and premature dehydration, and thereby increases the resistance of plants to short-term droughts.

Magnesium is part of chlorophyll and is directly involved in photosynthesis. Magnesium is also associated with the formation of sheets of such pigments as xanthophyll and carotene. Magnesium ions, adsorption associated with the colloids of the cells and along with other cations maintain ionic balance in plasma; ions like potassium, they contribute to the sealing of the plasma, reducing its swelling and participate as catalysts in certain biochemical reactions in the plant. Magnesium stimulates the activity of many enzymes involved in the formation and transformation of carbohydrates, proteins, organic acids, fats; affects the movement and transformation of phosphorus compounds, fruit formation and seed quality; accelerates the maturation of cereal seeds; contributes to the quality of the crop.

The role of sodium is to regulate and transport of carbohydrates in the plant. The insufficiency of sodium in the plant structures is reflected in the low rate of formation of chlorophyll, reduction of plant resistance is the sudden change in temperature.

One of the problems identified by the inventors is absorption of the basic elements, and this problem is solved using the chelated forms of the substances, which, according to the literature, are absorbed 5-7 times better than traditional fertilizer. The chelated compounds used in the present invention are, for example, citrates of magnesium, potassium and/or sodium.

Citrate of magnesium, potassium and sodium are represented by varieties of organic salts that have a high bioavailability. Citrates are characterized by a number of specific molecular effects, which include the involvement of the citrate in the Krebs cycle, the interaction with proteins-transporters of decarboxylation and physico-chemical features of the molecule of citrate. It should be particularly noted that all metabolites of the citrate are essential endogenous molecules. (see Torshin I., Gromova O., *Expert Data Analysis in Molecular Pharmacology*, MZNMO, 2012, ISBN 978-5-4439-0051-3). Near-full utilization make them ideal carriers of metals in the cell of the plant.

In a study of the impact of citrates in comparison with ethylenediaminetetraacetic acid (EDTA), intense accumulation of sugars in juice of berries was observed, which happened where the ligand used citric acid and its derivatives (citrate) (Shabanova I., *Nanomaterials in agriculture: production and application*, The Scientific Journal of the Kuban State Agrarian University, No. 27(3), March 2007, UDC 631.81.095.337). Studies also show that the translocation is the metabolic process and the metal can move through the plant mainly in the form of citrate (Tkachenko V. M., *Investigation of the mechanism of uptake of soil copper ions associated with different ligands*, Agrochemistry, 1986, No. 3, pp 74-77). This allows to assume that the mobile citrates of microelements penetrate the plant to a greater extent than ethylenediaminetetraacetic acid (EDTA).

Thus, in one embodiment, the composition can include a citrate in a form of a citrate salt or citric acid or a mixture of salts of the citric acid, in an amount of from 0.1% to 7% by volume of the total composition, preferably from 0.15% to 2.9%. Alternatively, the citrate can be potassium citrate ($K_3C_6H_5O_7$), and/or sodium citrate ($Na_3C_6H_5O_7$) and/or magnesium citrate ($C_6H_6O_7Mg$). An exemplary ratio of potassium citrate ($K_3C_6H_5O_7$) to magnesium citrate ($C_6H_6O_7Mg$) is 1-3 parts potassium citrate to 1 part magnesium citrate, or about 3 parts potassium citrate to 1 part magnesium citrate, more preferably about 2 parts potassium citrate to 1 part magnesium citrate.

The citrates and succinates act as acidity regulators. The acidity regulator can also include Ethane-1,2-dicarboxylic acid $C_4H_6O_4$ and 2-Hydroxypropane-1,2,3-tricarboxylic acid $C_6H_8O_7$ in a total amount of from 0.1% to 6.5% of the total composition. The composition includes a ratio of 1 part Ethane-1,2-dicarboxylic acid $C_4H_6O_4$ and 5-10 parts 2-Hydroxypropane-1,2,3-tricarboxylic acid $C_6H_8O_7$, and a total amount of both from 0.1% to 6.5% by volume of the total composition. Preferably, the ratio is 5:2. The acidity regulator can also include 2-Hydroxybutanedioic acid $C_4H_6O_5$ or a mixture of 2-Hydroxybutanedioic acid $C_4H_6O_5$ with Ethane-1,2-dicarboxylic acid $C_4H_6O_4$ in a total amount of from 0.1% to 6.5% of the total composition. The acidity regulator can also include 2-Hydroxybutanedioic acid $C_4H_6O_5$ an Ethane-1,2-dicarboxylic acid $C_4H_6O_4$ in a ratio of 1:(3-10), and in a total amount of from 0.1% to 6.5% of the total composition. As another option, the acidity regulator can also include 1 part 2-Hydroxybutanedioic acid $C_4H_6O_5$ to 3 parts of ethane-1,2-dicarboxylic acid. The acidity regulator can also include 2-Hydroxypropane-1,2,3-tricarboxylic acid $C_6H_8O_7$ and 2-Hydroxybutanedioic acid $C_4H_6O_5$ in a total amount of from 0.1% to 6.5% of the total composition. A ratio of 2-Hydroxypropane-1,2,3-tricarboxylic acid to 2-Hydroxybutanedioic acid can be 1:(3-10). A preferred ratio of 3 parts of 2-Hydroxypropane-1,2,3-tricarboxylic to 2 parts 2-Hydroxybutanedioic acid can also be used. The acidity regulator can use a ratio of 2-Hydroxypropane-1,2,3-tricarboxylic acid $C_6H_8O_7$ and 2-Hydroxybutanedioic acid $C_4H_6O_5$ and Ethane-1,2-dicarboxylic acid $C_4H_6O_4$, in an amount of from 0.1% to 6.5% by volume of the total composition. Alternatively, it can use a mixture Hydroxypropane-1,2,3-tricarboxylic acid with 2-Hydroxybutanedioic acid and Ethane-1,2-dicarboxylic acid are in a proportion of from 1 to 4 parts of 2-Hydroxypropane-1,2,3-tricarboxylic in the range from 1 to 10 parts of 2-Hydroxybutanedioic acid, and in the range from 1 to 10 parts of ethane-1,2-dicarboxylic acid. Alternatively, the ratio can be 1 part 2-Hydroxypropane-1,2,3-tricarboxylic acid to 3 parts 2-Hydroxybutanedioic acid to 1 parts of Ethane-1,2-dicarboxylic acid. The acidity regulator can comprise 0.6% to 5.2% by volume of the total composition. The acidity regulator can also include ethanoic acid $C_2H_4O_2$, in an amount of from 0.1% to 6.5% by volume of the total composition. The acidity regulator can also include chlorogenic acid $C_{16}H_{18}O_9$, in an amount of from 0.01% to 2.5% by volume of the total composition.

The pH of the composition should be from 6.5 to 10.9, preferably from 7.4 to 10.6.

Salicylates belong to the phytohormones of phenolic nature that have a regulatory effect on many physiological processes in plants, including thermogenesis, induction of resistance to the attack of pathogens, response to adverse environmental conditions, germination of seeds, flowering of plants, and ethylene synthesis during the ripening of fruits.

The mechanism of action of salicylic acid and its salts is expressed as part of the processes of amplification and multiplication of signals from the receptors in the cells of a plant, which ensures timely activation of the protection. The earliest reaction of plant organism to the introduction of the pathogen is local generation of reactive oxygen species (oxidative burst), which triggers a chain of subsequent defense reactions (Tyuterev S. L., *The scientific basis of induced baleneological plants: monograph*, Russian Academy of Agricultural Sciences, All Russian Scientific Research Institute of Plant Protection, Saint Petersburg: [b. I.], 2002, p. 298-324). A significant increase in the content of active forms of $O_2$ and $H_2O_2$ has an inhibitory effect on the development of pathogenic microorganisms. It is assumed that the activated forms of oxygen also play a significant role in lipoxidase membranes, modification of the cell wall, signal transduction (Richael C., Gilchrist D., *The hypersensitive response: A case of hold or fold*, Physiol. and Mol. Plant Pathol. 1999, 55(1): 5-12 (doi: 10.1006/pmpp.1999.0209); Pietras T., Malolepsza U., Witusik A., *Udzialnadtlenkuwodoruireaktywnychpostacitlenuwytwarzanychprzezoksydaze NADPH w odpornosciroslinprzeciwkopatogenom*, Wiad. Bot. 1997, 41(3-4): 43-50).

According to one aspect of the invention, the composition includes amino acids, which activate the mechanisms of plant growth after salt stress and low temperature increase the pollen fertility and the formation of fruit ovaries, and increase the ability of absorption of nutrients and resistance to pests and disease. The amino acid can be any of the following: aspartic acid HOOC—$CH_2$—$CHNH_2$—COOH, glutamic acid HOOC—$CH_2$—$CH_2$—$CHNH_2$—COOH, HOOC glycine $CH_2NH_2$, alanine $H_3C$—$CHNH_2$—COOH, valine $(H_3C)_2$—CH—$CHNH_2$—COOH, isoleucine $H_3CCH_2$—SN($H_3C$)—$CHNH_3$—COOH, leucine $(H_3C)_2$—CH—$CH_2$—$CHNH_2$—COOH, phenylalanine $C_6H_5$—$CH_2$—$CHNH_2$—COOH, Proline $(CH_2)_2$—$CH_2$—NH—CH—COOH, serine $HO_2C$—CH($NH_2$)$CH_2OH$, threonine H$_3$C—CH(Oh)-CHNH$_2$—COOH, methionine CH$_3$-s-(CH$_2$)$_2$—CHNH$_2$—COOH, tyrosine C$_6$H$_4$—CH$_2$—CHNH$_2$—COOH, cystine S$_2$—(CH$_2$)$_2$—(CHNH$_2$COOH)$_2$, lysine H$_2$N—(CH$_2$)$_4$—CHNH$_2$—COOH, histidine NH—(CH)$_2$=NC—CH$_2$—CHNH$_2$—COOH, and/or arginine H$_2$N(HN)C—NH—(CH$_2$)$_3$—CHNH$_2$—COOH. The amino acids preferably represent 0.0001% to 2% by volume of the total composition.

Plants better absorb natural α-amino acids in optically active L-configuration that include proteins. Such modifications are easily accepted by the plant organism and are quickly included into the metabolism as its own.

Humic substances act as a carrier of amino acids and carboxylic acids, which are organically fit into the overall structure of the composition. Humic substances are a broad and reactive class of natural compounds included in the composition of organic matter in soils, natural waters and solid fuels. The presence in the molecules of humic substances of a broad range of functional groups such as carboxyl, hydroxyl, in combination with the presence of aromatic fragments, determines their ability to interact with different types of metals and organic compounds.

Humic substances act as a depot for nutrients and trace elements, contribute to their transport in the plants, participate in the structuring of the soil, and increase their cation-exchange and buffer capacity. The humic particles in the liquid solution can be from 50 nm to 500 microns in size, or from 50 nm to 500 nm in size. The humic substances can be obtained by extraction from peat, leonardite, sapropel or brown coal, and, optionally an acid content of the humic substance is in a range from 0.1% to 55% by volume.

The composition can be diluted with water and subsequently introduced into prepared fruit and seeds, through an irrigation system, for example, by spraying or irrigation, and using manual or automatic spraying. The composition can be introduced into a root area of the plants, on leaves, stems, seeds, also using spraying, watering, moisturizing, fertigation, drip irrigation, sprinkler irrigation, and including manual, automatic or semi-automatic irrigation, with appropriate equipment and tools, including aquaponic and hydroponic systems.

As a further option, the composition can include electrolytes. As a further option, the composition can include dipotassium phosphate K$_2$HPO$_4$ and disodium phosphate Na$_2$HPO$_4$ in an amount of from 0.15% to 7% by volume of the total composition. As a further option, the composition can include ammonium sulfate (NH$_4$)$_2$SO$_4$ and potassium sulfate K$_2$SO$_4$ in an amount of from 0.05% to 7% by volume of the total composition. As trace elements, the composition can include boron, manganese, molybdenum, selenium, iodine, in an amount of from 0.001% to 2% of the total composition. As a further option, the composition can include chlorogenic acid in an amount of from 0.01% to 2.5% of the total composition. As a further option, the composition can include a phosphate in an amount of from 0.15% to 7% of the total composition. As a further option, the composition can include a sulfate in an amount of from 0.05% to 7% of the total composition. As a further option, the composition can include an acetate in an amount of 0.1% to 7% by volume of the total composition.

As a further option, the composition can include potassium acetate (C$_2$H$_3$KO$_2$) or sodium acetate (C$_2$H$_3$O$_2$Na) or a mixture of potassium acetate and sodium acetate, in an amount of 0.1% to 7% by volume of the total composition, preferably 0.15% to 2.9% by volume of the total composition. As a further option, the composition can include aminoacetic acid (NH$_2$—CH$_2$—COOH), in an amount of 0.01% to 0.5% by volume of the total composition. As a further option, the composition can include jasmonic acid (C$_{12}$H$_{18}$O$_3$), in an amount of 0.1% to 7% by volume of the total composition, preferably 0.15% to 2.9% by volume of the total composition.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A composition for stimulating seed germination, plant growth and resistance to stress factors caused by biotic and abiotic stress, the composition comprising:
    a liquid solution containing a water-soluble silicon-organic compounds containing potassium silicate or sodium silicate in an amount of 0.5% to 20% by volume of the total composition;
    the liquid solution comprising a solvent to dissolve the water-soluble silicon-organic compounds;
    salicylate in an amount of 0.1% to 2% by volume of the total composition;
    the liquid solution also containing succinate in an amount of from 0.5% to 12% of the total composition and citrate in an amount of from 0.1% to 6% of the total composition, with both acting as an acidity regulator;
    at least one chelate in an amount of from 0.05% to 25% of the total composition;
    at least one alcohol in an amount of 0.1 to 25% by volume of the total composition; and
    at least one trace element and/or at least one carboxylic acid and/or at least one amino acid in an amount of 0.001% to 15% by volume of the total composition,
    wherein the pH of the composition is from 6.5 to 10.9.

2. The composition of claim 1, further comprising humic particles in the liquid solution, wherein the humic particles are from 50 nm to 500 microns in size.

3. The composition of claim 1, wherein the alcohol is any of propylene glycol, glycerin(C$_3$H$_8$O$_3$), ethylene glycol (C$_2$H$_6$O$_2$), polyvinyl alcohol or ethyl alcohol, and wherein the alcohol is used as a dispersive agent to dissolve the water-soluble silicon-organic compounds in the water, from about 0.1% to about 25% of a total volume of the water-soluble silicon-organic compounds.

4. The composition of claim 1, wherein a ratio of potassium silicate to sodium silicate is from about 1 to 5 to 1 to 10, which is obtained by mixing at a temperature of from 20 to 85 degrees Celsius.

5. The composition of claim 1, wherein the water-soluble silicon-organic compounds comprising large-pore or porous or granular or solid particles of silica.

6. The composition of claim 1, wherein the water-soluble silicon-organic compound comprising silica particles of 0.1 μm to 100 μm in size.

7. The composition of claim 1, wherein the water-soluble silicon compound comprising silica particles.

8. The composition of claim 1, wherein the succinate is potassium succinate (K$_2$C$_4$H$_4$O$_4$) in an amount of 0.15% to 2.9% by volume of the total composition.

9. The composition of claim 1, wherein the succinate is sodium succinate (Na$_2$C$_4$H$_4$O$_4$) in an amount of 0.1% to 5% by volume of the total composition.

10. The composition of claim 1, wherein the succinate is calcium succinate (CaC$_4$H$_4$O$_4$) in an amount of 0.1% to 5% by volume of the total composition.

11. The composition of claim 1, wherein the succinate is magnesium succinate ($Mg_2C_4H_4O_4$) in an amount of 0.1% to 5% of the total composition.

12. The composition of claim 1, wherein the citrate is a citrate salt or citric acid or a mixture of salts of the citric acid.

13. The composition of claim 1, wherein the citrate is a citrate salt or citric acid or a mixture of salts of the citric acid, in an amount of from 0.15% to 2.9% by volume of the total composition.

14. The composition of claim 1, wherein the citrate is potassium citrate ($K_3C_6H_5O_7$), and/or sodium citrate ($Na_3C_6H_5O_7$) and/or magnesium citrate ($C_6H_6O_7Mg$).

15. The composition of claim 1, wherein the salicylate is sodium salicylate or potassium salicylate in an amount of 0.1% to 0.5% by volume of the total composition.

16. The composition of claim 1, wherein the salicylate includes salicylic acid in an amount of from 0.1% to 2.5% by volume of the total composition.

17. The composition of claim 1, wherein the salicylate comprising magnesium salicylate in an amount of 0.1% to 2.5% by volume of the total composition.

18. The composition of claim 1, wherein the acidity regulator comprising Ethane-1,2-dicarboxylic acid $C_4H_6O_4$ and 2-Hydroxypropane-1,2,3-tricarboxylic acid $C_6H_8O_7$ in a total amount of from 0.1% to 6.5% of the total composition.

19. The composition of claim 1, wherein the acidity regulator comprising a ratio of 1 part Ethane-1,2-dicarboxylic acid $C_4H_6O_4$ and 5-10 parts 2-Hydroxypropane-1,2,3-tricarboxylic acid $C_6H_8O_7$, and a total amount of both from 0.1% to 6.5% by volume of the total composition.

20. The composition of claim 1, wherein the acidity regulator includes 2-Hydroxybutanedioic acid $C_4H_6O_5$ or a mixture of 2-Hydroxybutanedioic acid $C_4H_6O_5$ with Ethane-1,2-dicarboxylic acid $C_4H_6O_4$ in a total amount of from 0.1% to 6.5% of the total composition.

21. The composition of claim 1, wherein the acidity regulator comprising 2-Hydroxybutanedioic acid $C_4H_6O_5$ an Ethane-1,2-dicarboxylic acid $C_4H_6O_4$ in a ratio of 1:(3-10), and in a total amount of from 0.1% to 6.5% of the total composition.

22. The composition of claim 1, wherein the acidity regulator comprising 2-Hydroxypropane-1,2,3-tricarboxylic acid $C_6H_8O_7$ and 2-Hydroxybutanedioic acid $C_4H_6O_5$ in a total amount of from 0.1% to 6.5% of the total composition.

23. The composition of claim 1, wherein the acidity regulator comprising ethanoic acid $C_2H_4O_2$, in an amount of 0.1% to 6.5% by volume of the total composition.

24. The composition of claim 1, wherein the chelate comprising any of potassium, sodium, magnesium, calcium, zinc, copper, iron, and sulfur.

25. The composition of claim 1, wherein the amino acid is any of the following: aspartic acid $HOOC-CH_2-CHNH_2-COOH$, glutamic acid $HOOC-CH_2-CH_2-CHNH_2-COOH$, HOOC glycine $CH_2NH_2$, alanine $H_3C-CHNH_2-COOH$, valine $(H_3C)_2-CH-CHNH_2-COOH$, isoleucine $H_3CCH_2-SN(H_3C)-CHNH_2-COOH$, leucine $(H_3C)_2-CH-CH_2-CHNH_2-COOH$, phenylalanine $C_6H_5-CH_2-CHNH_2-COOH$, Proline $(CH_2)_2-CH_2-NH-CH-COOH$, serine $HO_2C-CH(NH_2)CH_2OH$, threonine $H_3C-CH(Oh)-CHNH_2-COOH$, methionine $CH_3-s-(CH_2)_2-CHNH_2-COOH$, tyrosine $C_6H_4-CH_2-CHNH_2-COOH$, cystine $S_2-(CH_2)_2-(CHNH_2COOH)_2$, lysine $H_2N-(CH_2)_4-CHNH_2-COOH$, histidine $NH-(CH)_2=NC-CH_2-CHNH_2-COOH$, arginine $H_2N(HN)C-NH-(CH_2)_3-CHNH_2-COOH$, wherein the amino acids represent 0.0001% to 2% by volume of the total composition.

26. The composition of claim 1, further comprising humic substances obtained by extraction from peat, leonardite, sapropel or brown coal, wherein an acid content of the humic substances is in the range from 0.1% to 55% by volume.

27. The composition of claim 1, further comprising potassium acetate ($C_2H_3KO_2$) or sodium acetate ($C_2H_3O_2Na$) or a mixture of potassium acetate and sodium acetate, in an amount of 0.1% to 7% by volume of the total composition.

28. The composition of claim 1, further comprising aminoacetic acid ($NH_2-CH_2-COOH$), in an amount of 0.01% to 0.5% by volume of the total composition and/or chlorogenic acid in an amount of from 0.01% to 2.5% of the total composition and/or jasmonic acid ($C_{12}H_{18}O_3$), in an amount of 0.1% to 7% by volume of the total composition.

\* \* \* \* \*